United States Patent [19]
Hartnett et al.

[11] 4,456,313
[45] Jun. 26, 1984

[54] ROLLER BEARING WITH SPECIALLY CONSTRUCTED ROLLERS

[75] Inventors: Michael J. Hartnett, Woodbury; Chris J. Robinson, Winsted; Edwin B. Tharp, Norfolk, all of Conn.

[73] Assignee: The Torrington Company, Torrington, Conn.

[21] Appl. No.: 418,752

[22] Filed: Sep. 16, 1982

[51] Int. Cl.³ .............................................. F16C 33/36
[52] U.S. Cl. ..................................... 308/202; 308/215; 29/148.4 R
[58] Field of Search ........... 308/202, 215, 216, 207 R, 308/207 A; 29/148.4 R, 148.4 A, 148.4 D

[56] References Cited

U.S. PATENT DOCUMENTS

| | | | |
|---|---|---|---|
| 3,527,513 | 9/1970 | Hewko | 308/215 |
| 3,713,712 | 1/1973 | Derner et al. | 308/215 |
| 3,990,753 | 11/1976 | Kellstrom et al. | 308/202 |
| 4,227,754 | 10/1980 | Kellström | 308/215 |

*Primary Examiner*—Lenard A. Footland
*Attorney, Agent, or Firm*—F. S. Troidl

[57] ABSTRACT

Each roller in a roller bearing has varying diameters along its length. The longitudinal surface is formed along varying radii of curvature. The diameters are functions of the contact stress along the roller, the length of the roller, any angular misalignment, and the effective diameter of the bearing. The varying diameters are such that a uniform contact stress is placed on each roller.

If desired instead of the rollers, a race may be shaped to cause the uniform contact stress.

5 Claims, 6 Drawing Figures

CONTACT STRESS PATTERN

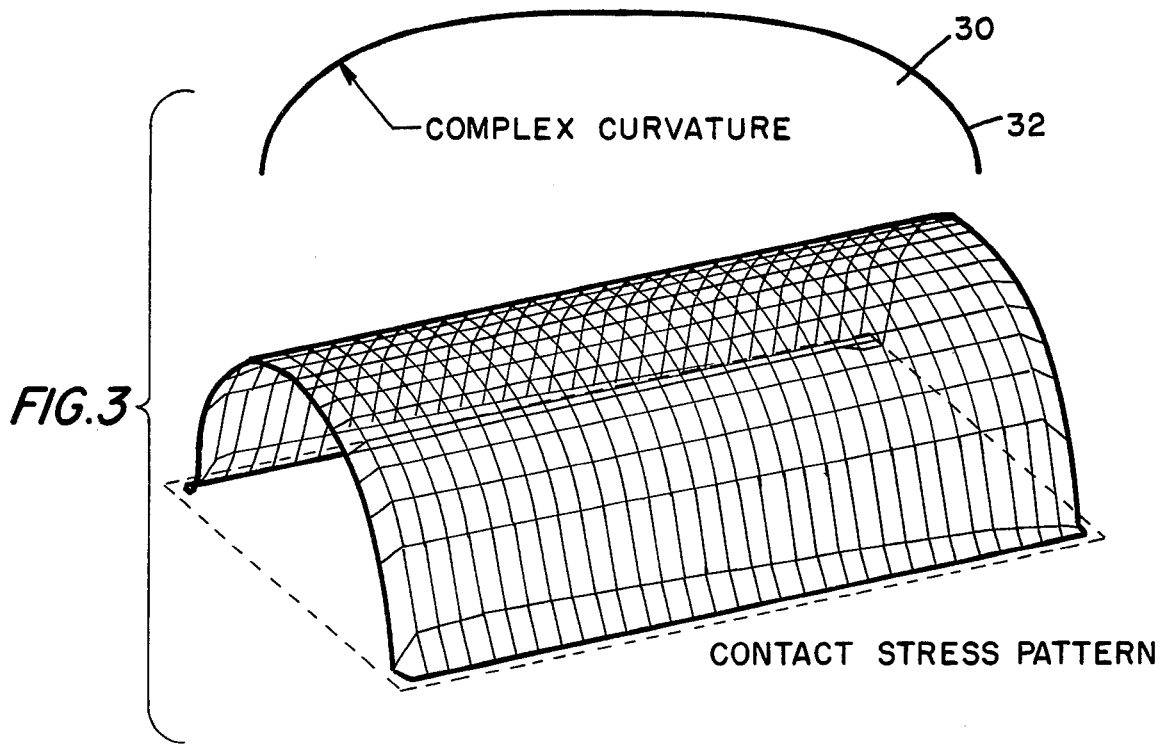
FIG.3 — COMPLEX CURVATURE / CONTACT STRESS PATTERN
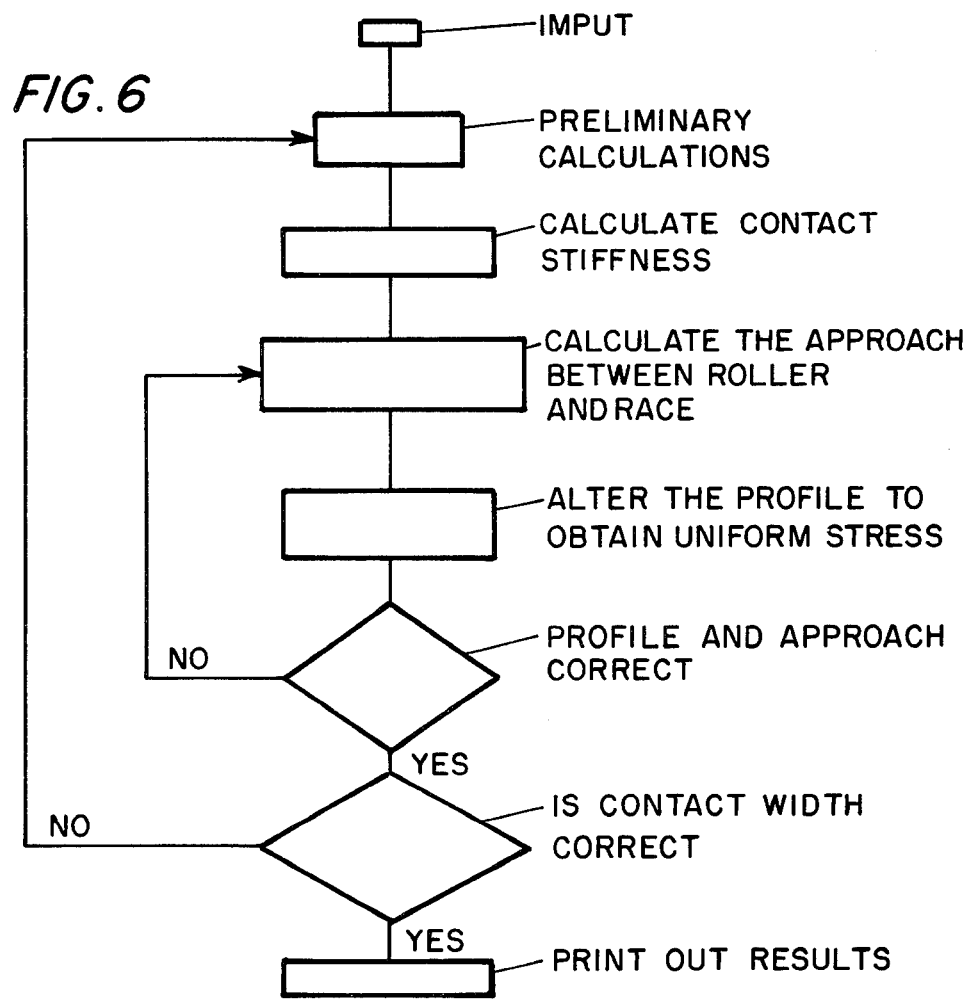
FIG.6

ROLLER BEARING WITH SPECIALLY CONSTRUCTED ROLLERS

This invention relates to roller bearings. More particularly, this invention is a roller bearing containing rollers constructed so that a uniform contact stress is placed on the rollers.

Bearings are sized and chosen based on their capacity to support a level of loading for a number of revolutions of the inner ring. The failure mode that dictates the bearing size and hence the reliability for a given load level is surface fatigue. Surface fatigue of the components of bearings is very heavily dependent upon contact stress and the number of stress repetitions. The reliability of a bearing can be very substantially improved, with all other factors held constant, by reducing the magnitude of contact stress.

If the stress is concentrated at a particular point or points on the roller, the bearing will fail quickly. For example, a bearing with right cylindrical races and rollers will have a short life because of stress concentrations at the end of the rollers. Attempts have been made (1) to remove these stress concentrations, and (2) to make the contact stress uniform along the length of the roller. These attempts have removed the stress concentrations but have not given a uniform stress along the length of the roller. A roller which does not have stress concentrations lasts longer than right cylindrical rollers. But these rollers do not last as long as they would if constructed not only to remove the stress concentrations but also to have a uniform stress along the length of the roller.

A bearing which contains rollers which provides a uniform stress along the length of the roller is highly desirable to provide roller bearings having a maximum obtainable life. This invention provides such a bearing.

Briefly described, this invention is a roller bearing having an outer race and an inner race. The rollers between the races have a specifically constructed longitudinal external surface. The roller has varying diameters and varying radii of curvature along its length. The diameters are functions of the contact stress along the roller, the length of the roller, any contact angular misalignment of the roller axis in relation to the inner race axis, and the effective diameter of the bearing. The varying diameters are also such that within an acceptable error limit, a uniform contact stress is placed on each roller along the length of the roller. If desired, instead of the rollers, the inner race outside surface, or the outer race inside surface may be shaped to cause the uniform contact stress.

The invention as well as its many advantages may be further understood by reference to the following detailed description and drawings in which:

FIG. 3 is a view of the profile of a preferred embodiment of this invention and the contact stress pattern on this preferred embodiment;

FIG. 6 is a chart showing the steps to determine the shapes of the rollers of this invention.

In the various figures, like parts are referred to by like numbers.

Figure 1:
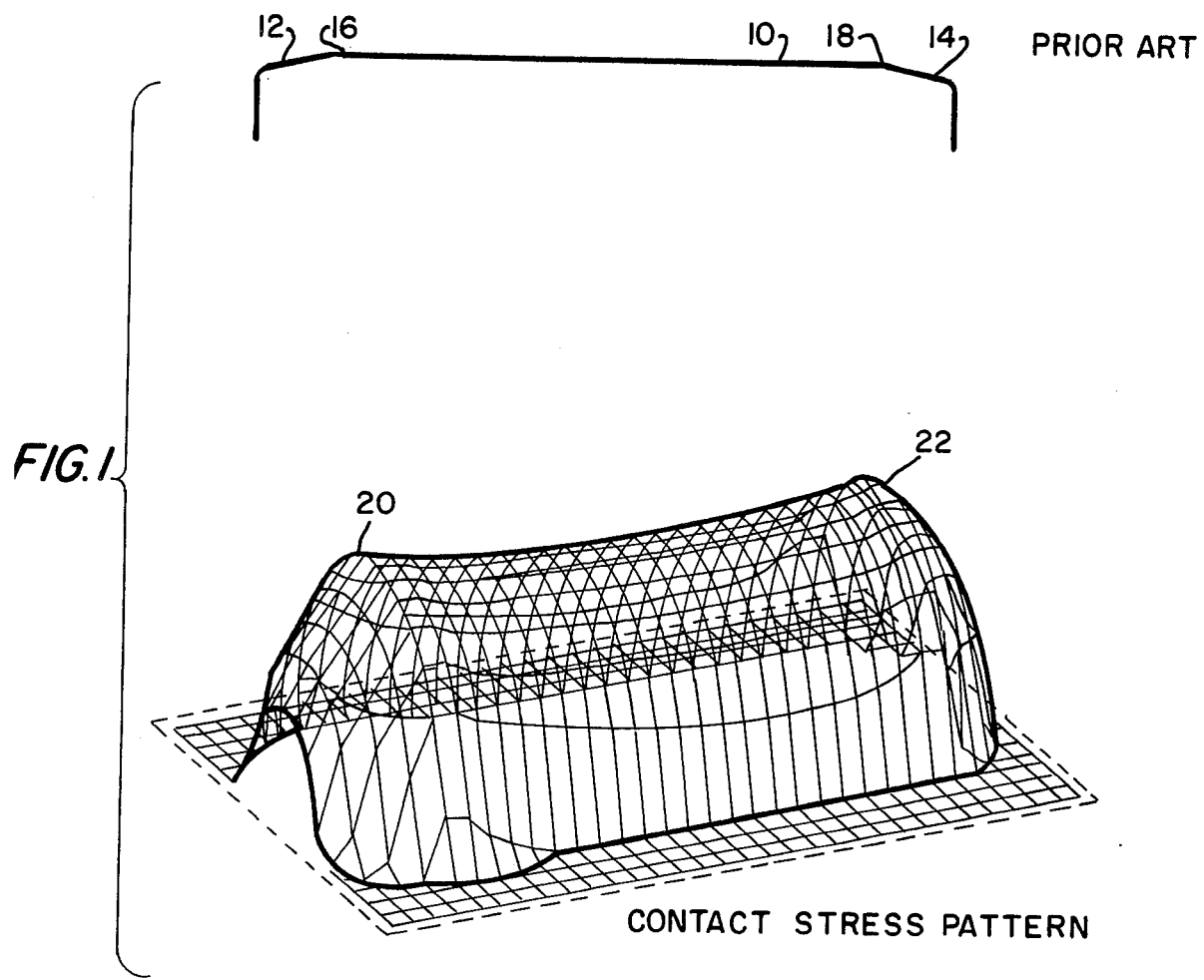
FIG. 1 is a view of the profile of a prior art roller and illustrating the usual contact stress pattern on the rollers.

Referring to the drawings, and more particularly to FIG. 1, a prior art standard profile roller and its contact stress pattern is shown. These rollers are commonly used in bearings. The roller 10 has a constant diameter throughout most of its length. The roller has a chamfer or radius at its ends 12 and 14. The contact stress is concentrated at the dividing lines 16 and 18 between the constant diameter portion 10 and the chamfers 12 and 14, respectively.

The concentrations of contact stress are shown at 20 and 22 on the contact stress pattern. Because of the stress concentrations the bearing with rollers shown in FIG. 1 will relatively quickly develop frets, pits, and other defects in the areas 16 and 18 and fail in fatigue.

Figure 2:
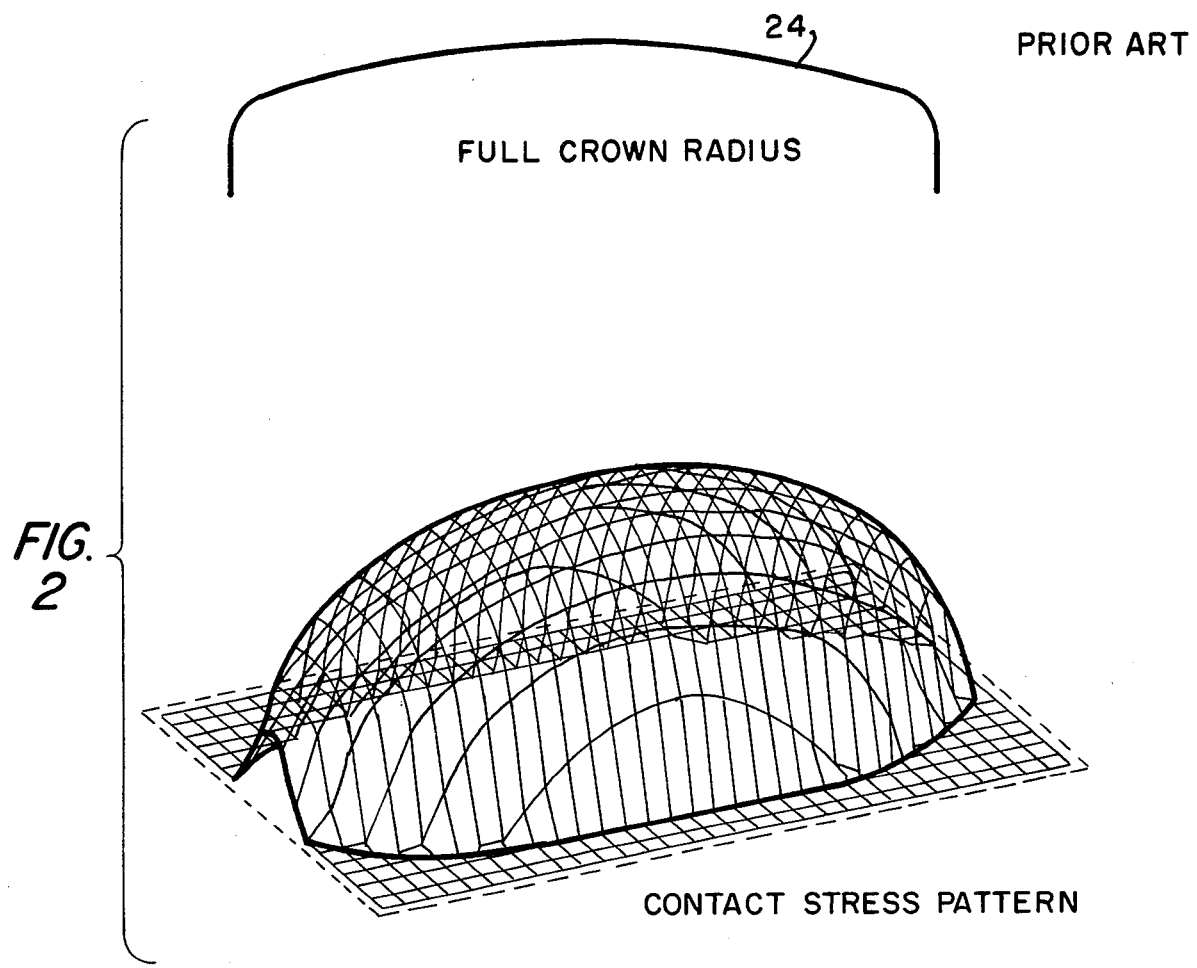
FIG. 2 is a view of the profile of a prior art full crown radius and illustrating the usual contact stress pattern on a full crown radius roller.

Attempts have been made to make rollers which do not have stress concentrations and have uniform contact stress along the length of the roller. One result of such attempts is shown in FIG. 2 which shows a prior art full crown radius roller 24. Looking at the contact stress pattern in FIG. 2 it can be seen that with the full crown radius roller 24 the stress concentrations have been removed. However, the contact stress pattern is not uniform along the length of the roller. The contact stress is highest at the longitudinal center of the roller and continually decreases from the center toward the ends of the rollers. Thus, though the stress concentrations where removed, the problem remains of not having uniform contact stress along the length of the roller. The full crown radius roller of FIG. 2 often wears out as quickly as the standard profile roller of FIG. 1.

One preferred embodiment of the invention is shown in FIG. 3. The roller 30, called an optimum profile roller, has a longitudinal external surface 32 having varying diameters along its full length. Also, the external surface 32 is formed along varying radii of curvature along its length. The curvature is a complex curvature.

The contact stress pattern shows that all stress concentrations are removed and a uniform contact stress exists along the full length of the roller.

The stress is uniform along the length of the roller; thus the maximum stress is less using the roller of FIG. 3 than the maximum stress using the rollers of FIG. 1 or FIG. 2. For example, at similar loads, a maximum stress of 414,000 psi may occur at points 16 and 18 using the roller of FIG. 1, a maximum stress of 437,000 psi may occur at the longitudinal center using the roller of FIG. 2 but a uniform stress of only 357,000 psi will occur using the roller of FIG. 3. The rollers of FIG. 3 will last up to six times or more longer than the rollers of FIG. 1 or FIG. 2.

The external surface 32 of a roller 30 in a given bearing operating under known conditions are functions of the contact stress along the roller, the length of the roller, any contact angular misalignment of the roller axis in relation to the race axis, and the effective diameter of the bearing. These may be represented by the formulas:

$$\frac{PK}{LK_b} \tag{1}$$

where $P$ = maximum contact stress along the roller (lb./in.$^2$)
$L$ = roller length (in.)

Figure 4:
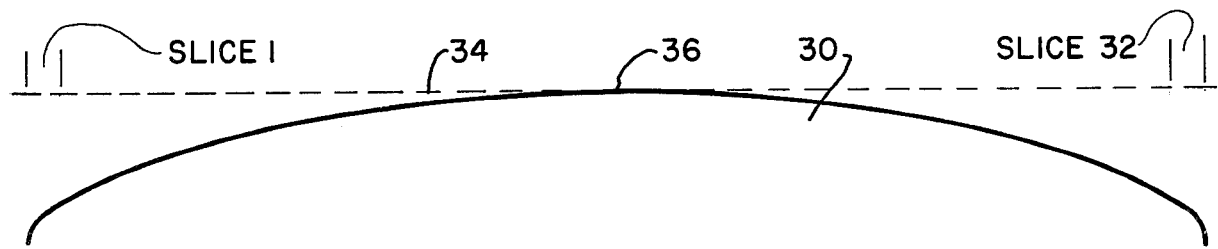
FIG. 4 is a fragmentary schematic sectional view of the embodiment of FIG. 3.

-continued $K$ = a constant relating to Poisson's ratio, and Young's modulus of the roller and race materials.
$K_b = 6.09824 \times 10^{-8}$ (in.$^2$/lb.)
If steel is used for the rollers and races, $K = K_b$.

$$\frac{\theta}{L} \quad (2)$$

where $\theta$ = angular misalignment (rads)
$L$ = roller length (in.)

$$\frac{D_e D_r}{D_e + D_r} = D_{eff} \quad (3)$$

where $D_e$ = roller diameter
$D_r$ = race diameter: $D_r > 0$ for inner race contact; $D_r < 0$ for outer race contact To determine the external surface of the cylindrical roller 30 the length of the roller is divided into a predetermined number of slices. For example, as shown in FIG. 4 the roller 30 is divided into 32 slices. For a given application the values of $$\frac{PK}{LK_b}, \frac{\theta}{L}, \text{ and } \frac{D_e D_r}{D_e + D_r}$$

are calculated. The broken line, or envelope 34, touches at point 36 at the longitudinal center of roller 30 and is parallel to the roller center line. The vertical separation from broken line 34 of any point on surface 32 is called the drop. The drop at the center of each slice divided by the square of the length of the roller, is found on a previously prepared table. From the previously prepared table the diameter of the roller 30 at the longitudinal center of each of the 32 slices is calculated. The previously prepared table is accurate within an acceptable error limit, of say, up to 10%.

Table I is an example of a previously prepared table. Table I is for a cylindrical bearing with a $D_{eff}$ of 0.09. In the table different values of $(\theta/L)$ and $(PK/LK_b)$ are shown. The drops are in millionths of an inch divided by $L^2$. In Table I only the 16 slices from the center of the roller to one end of the roller are shown. The roller 30 is preferably made symmetrical and, therefore, the drops in each of the slices on the other side of the roller will be the same as the corresponding drops shown in Table I.

Looking at Table I it can be seen, for example, that in a bearing having a $D_{eff}=0.09$, a $(\theta/L)=0.002$, and a $(PK/LK_b)=600,000$, a roller diameter of 0.1 inches and a roller length of 1.0 inches, the drop at the end of the roller is 1025, the drop next to the end of the roller is 900, the next drop is 811, and so forth. From this information, it can be determined that the diameter of the roller in the center of slice 1 is 0.097950 inches, at the center of slice 2 is 0.098200 and so forth.

Figure 5:
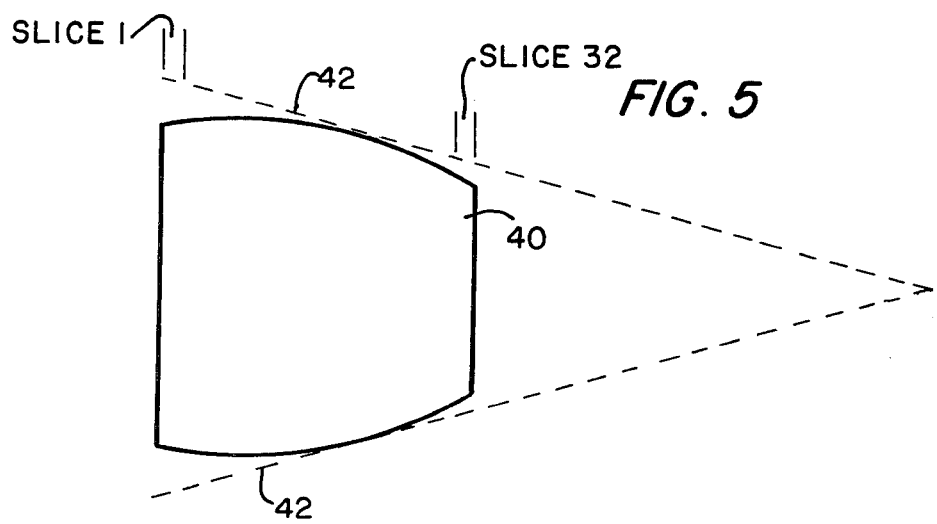
FIG. 5 is a schematic sectional view of a second preferred embodiment of this invention.

Referring to FIG. 5 a roller 40 similar to a tapered roller is shown divided into 32 slices. The envelope of a similar tapered roller is indicated by the broken line 42. The drop of the center of each of the slices is measured perpendicular to the roller centerline from the envelope 42.

TABLE I

| | | | | | | | Deff = 0.090000 | | | | | | | | | |
|---|---|---|---|---|---|---|---|---|---|---|---|---|---|---|---|---|
| SLOPE/L | PK/LKb | end of roller | | | | | DROP*106/L2 | | | | | | | | center of roller | |
| .000000 | 400000. | 75 | 47 | 34 | 26 | 20 | 16 | 12 | 9 | 6 | 5 | 4 | 3 | 2 | 1 | 1 | 0 |
| .000000 | 450000. | 95 | 59 | 43 | 33 | 25 | 20 | 15 | 12 | 9 | 6 | 5 | 3 | 2 | 1 | 1 | 0 |
| .000000 | 500000. | 117 | 73 | 53 | 40 | 31 | 24 | 19 | 14 | 11 | 8 | 5 | 4 | 3 | 2 | 1 | 0 |
| .000000 | 550000. | 140 | 87 | 63 | 48 | 37 | 29 | 22 | 17 | 13 | 10 | 6 | 5 | 3 | 2 | 1 | 0 |
| .000000 | 600000. | 167 | 104 | 75 | 57 | 44 | 34 | 27 | 20 | 15 | 11 | 8 | 5 | 3 | 2 | 1 | 0 |
| .001000 | 400000. | 507 | 448 | 405 | 366 | 330 | 296 | 262 | 229 | 197 | 166 | 135 | 105 | 77 | 49 | 23 | 0 |
| .001000 | 450000. | 522 | 456 | 410 | 369 | 332 | 296 | 262 | 228 | 196 | 165 | 134 | 104 | 75 | 48 | 23 | 0 |
| .001000 | 500000. | 541 | 467 | 417 | 573 | 334 | 298 | 263 | 229 | 196 | 165 | 133 | 103 | 75 | 48 | 22 | 0 |
| .001000 | 550000. | 563 | 479 | 425 | 379 | 338 | 301 | 265 | 229 | 196 | 164 | 132 | 103 | 74 | 47 | 22 | 0 |
| .001000 | 600000. | 588 | 494 | 435 | 386 | 343 | 304 | 267 | 231 | 197 | 165 | 132 | 102 | 74 | 47 | 22 | 0 |
| .002000 | 400000. | 960 | 870 | 796 | 726 | 659 | 593 | 529 | 465 | 403 | 341 | 280 | 219 | 160 | 103 | 49 | 0 |
| .002000 | 450000. | 972 | 874 | 797 | 725 | 657 | 590 | 526 | 462 | 399 | 337 | 276 | 216 | 157 | 101 | 47 | 0 |
| .002000 | 500000. | 987 | 881 | 800 | 726 | 657 | 589 | 524 | 459 | 396 | 333 | 273 | 213 | 154 | 98 | 46 | 0 |
| .002000 | 550000. | 1005 | 889 | 805 | 728 | 657 | 588 | 522 | 456 | 393 | 331 | 270 | 210 | 152 | 97 | 45 | 0 |
| .002000 | 600000. | 1025 | 900 | 811 | 732 | 659 | 588 | 521 | 455 | 391 | 328 | 268 | 203 | 150 | 95 | 44 | 0 |
| .003000 | 400000. | 1419 | 1298 | 1192 | 1092 | 994 | 897 | 802 | 707 | 613 | 520 | 428 | 337 | 247 | 159 | 76 | 0 |
| .003000 | 450000. | 1429 | 1300 | 1191 | 1089 | 989 | 891 | 796 | 701 | 607 | 514 | 423 | 332 | 243 | 156 | 74 | 0 |
| .003000 | 500000. | 1441 | 1304 | 1191 | 1087 | 986 | 887 | 791 | 696 | 601 | 508 | 417 | 327 | 238 | 152 | 72 | 0 |
| .003000 | 550000. | 1455 | 1309 | 1193 | 1087 | 984 | 884 | 787 | 691 | 596 | 503 | 412 | 322 | 234 | 149 | 70 | 0 |
| .003000 | 600000. | 1473 | 1317 | 1196 | 1087 | 982 | 881 | 784 | 687 | 592 | 499 | 408 | 319 | 231 | 147 | 69 | 0 |

With the roller of FIG. 5, it is desirable to have a $D_{effL}$ at the large end and a $D_{effS}$ at the small end.

Table II shows a previously prepared table with a roller 40 having a $D_{effL}$ at the large end = 2.079894 and a $D_{effS}$ at the small end = 1.939464. If $(\theta/L)=0.001$ and $(PK/LK_b)=300,000$, and roller length of 1.0 inch, it can be seen from Table II that for a steel roller and steel race, at the large end the drop at the center of slice 1 is 1487, the drop at the center of the next slice is 1147, and so forth with the drop at the slice to the left of the longitudinal center of the roller 40 being 164. The drop at the center of the slice to the right of the longitudinal center is 133, the drop at the center of the next slice is 102, and so forth with the drop at the center of slice 32 being 548. If the misalignment loads the large end of the roller, $(\theta/L)$ is positive; if the misalignment loads the small end of the roller, $(\theta/L)$ is negative.

The chart of FIG. 6 illustrates the steps performed on a computer to make tables like Table I and Table II. The information to define the contact geometry and loading constitute the "Input." This information includes applied load, roller diameter at longitudinal center, roller length, roller angle (if similar to tapered roller), pitch diameter, roller to race misalignment, Poisson's ratio, and Young's modulus of roller and raceway, and number of slices to divide the roller-race contact length into.

The "Preliminary calculations" include locating the longitudinal center of each roller slice, and determining the roller diameter and race diameter at such center. Also, the roller-race contact width of each slice is determined by known mathematical formulas assuming each slice carries the same applied load. The initial clearance due to misalignment between the roller and race along the center of the roller is also determined.

an ellipsoidal distribution. The contact stiffness can be shown mathematically. The contact pressure over a given area equals the contact stiffness times the "ap-

TABLE II

| SLOPE/L | PK/LKb | end of roller | | | | | | DROP*106/L2 | | | | | | | | center of roller |
|---------|--------|---------------|---|---|---|---|---|---|---|---|---|---|---|---|---|---|
| | | \multicolumn{16}{l}{Deff large ends = 2.079834  Deff small ends = 1.919464} |

| SLOPE/L | PK/LKb | end of roller | | | | | | | | | | | | | | center of roller |
|---------|--------|------|------|------|------|------|------|------|------|------|------|------|------|------|------|------|
| −.00300 | 200000. | 54 | 0 | 20 | 68 | 130 | 199 | 274 | 353 | 435 | 520 | 606 | 694 | 786 | 879 | 973 | 1067 |
| −.00300 | 300000. | 1161 | 1254 | 1349 | 1446 | 1546 | 1647 | 1749 | 1854 | 1962 | 2072 | 2186 | 2305 | 2431 | 2571 | 2735 | 2975 |
| | | 283 | 68 | 6 | 0 | 20 | 59 | 110 | 171 | 238 | 310 | 387 | 469 | 555 | 647 | 741 | 834 |
| −.00300 | 400000. | 928 | 1022 | 1119 | 1221 | 1327 | 1437 | 1551 | 1669 | 1793 | 1923 | 2061 | 2211 | 2378 | 2573 | 2821 | 3218 |
| | | 706 | 293 | 117 | 34 | 1 | 0 | 17 | 51 | 96 | 152 | 216 | 287 | 366 | 454 | 547 | 641 |
| −.00300 | 500000. | 735 | 829 | 930 | 1089 | 1155 | 1277 | 1406 | 1542 | 1688 | 1846 | 2019 | 2211 | 2434 | 2704 | 3065 | 3658 |
| | | 1313 | 672 | 359 | 181 | 78 | 23 | 0 | 0 | 18 | 52 | 98 | 156 | 225 | 305 | 399 | 492 |
| −.00300 | 600000. | 586 | 680 | 788 | 906 | 1034 | 1171 | 1319 | 1480 | 1654 | 1847 | 2063 | 2310 | 2602 | 2966 | 3463 | 4281 |
| | | 2023 | 1139 | 673 | 390 | 210 | 96 | 30 | 0 | 0 | 3 | 27 | 70 | 127 | 197 | 279 | 372 |
| | | 475 | 589 | 714 | 850 | 998 | 1158 | 1333 | 1525 | 1737 | 1974 | 2241 | 2552 | 2924 | 3393 | 4035 | 5083 |
| −.00200 | 200000. | 92 | 7 | 0 | 15 | 45 | 84 | 127 | 175 | 226 | 279 | 334 | 391 | 451 | 514 | 576 | 639 |
| −.00200 | 300000. | 701 | 764 | 827 | 893 | 961 | 1031 | 1102 | 1176 | 1252 | 1331 | 1413 | 1501 | 1596 | 1704 | 1837 | 2045 |
| | | 386 | 140 | 46 | 8 | 0 | 7 | 26 | 55 | 91 | 132 | 178 | 223 | 283 | 344 | 406 | 463 |
| −.00200 | 400000. | 531 | 594 | 660 | 731 | 806 | 884 | 967 | 1054 | 1146 | 1245 | 1352 | 1470 | 1606 | 1770 | 1987 | 2353 |
| | | 875 | 430 | 223 | 109 | 44 | 11 | 0 | 1 | 15 | 40 | 72 | 113 | 160 | 216 | 279 | 341 |
| −.00200 | 500000. | 404 | 465 | 536 | 614 | 699 | 789 | 887 | 992 | 1107 | 1234 | 1375 | 1536 | 1728 | 1967 | 2296 | 2858 |
| | | 1543 | 871 | 526 | 318 | 183 | 96 | 41 | 11 | 0 | 1 | 16 | 43 | 80 | 129 | 191 | 254 |
| −.00200 | 600000. | 316 | 379 | 455 | 542 | 639 | 745 | 862 | 991 | 1134 | 1296 | 1480 | 1695 | 1957 | 2290 | 2756 | 3543 |
| | | 2284 | 1368 | 871 | 556 | 345 | 200 | 102 | 39 | 5 | 0 | 0 | 0 | 20 | 56 | 105 | 165 |
| | | 237 | 319 | 412 | 516 | 632 | 761 | 905 | 1065 | 1246 | 1451 | 1688 | 1967 | 2308 | 2745 | 3357 | 4374 |
| −.00100 | 200000. | 169 | 52 | 13 | 0 | 0 | 5 | 17 | 34 | 53 | 75 | 99 | 125 | 154 | 185 | 216 | 248 |
| −.00100 | 300000. | 279 | 310 | 342 | 377 | 414 | 452 | 493 | 535 | 579 | 627 | 678 | 735 | 799 | 876 | 977 | 1154 |
| | | 547 | 269 | 144 | 75 | 34 | 11 | 1 | 0 | 3 | 12 | 27 | 46 | 69 | 99 | 130 | 161 |
| −.00100 | 400000. | 193 | 224 | 259 | 298 | 342 | 389 | 440 | 496 | 557 | 625 | 701 | 783 | 892 | 1025 | 1211 | 1545 |
| | | 1114 | 638 | 400 | 254 | 158 | 93 | 49 | 21 | 5 | 0 | 0 | 8 | 24 | 49 | 80 | 111 |
| −.00100 | 500000. | 143 | 174 | 213 | 260 | 313 | 372 | 438 | 513 | 596 | 691 | 801 | 931 | 1091 | 1299 | 1597 | 2128 |
| | | 1841 | 1138 | 762 | 522 | 356 | 238 | 152 | 90 | 46 | 18 | 3 | 0 | 4 | 21 | 52 | 83 |
| −.00100 | 600000. | 114 | 146 | 191 | 247 | 312 | 387 | 473 | 570 | 683 | 813 | 966 | 1150 | 1380 | 1682 | 2116 | 2872 |
| | | 2606 | 1660 | 1131 | 786 | 543 | 366 | 235 | 139 | 70 | 25 | 1 | 0 | 0 | 0 | 7 | 30 |
| | | 67 | 116 | 177 | 249 | 333 | 431 | 543 | 672 | 821 | 994 | 1199 | 1447 | 1757 | 2163 | 2743 | 3729 |
| 0.00000 | 200000. | 390 | 242 | 171 | 125 | 93 | 69 | 50 | 35 | 24 | 15 | 7 | 2 | 0 | 0 | 0 | 0 |
| 0.00000 | 300000. | 0 | 0 | 0 | 4 | 10 | 17 | 26 | 37 | 50 | 66 | 87 | 112 | 145 | 190 | 261 | 406 |
| | | 853 | 545 | 388 | 288 | 216 | 161 | 119 | 85 | 59 | 37 | 21 | 9 | 1 | 0 | 0 | 0 |
| 0.00000 | 400000. | 0 | 0 | 3 | 12 | 24 | 40 | 60 | 84 | 114 | 150 | 195 | 251 | 324 | 425 | 580 | 883 |
| | | 1471 | 964 | 694 | 517 | 390 | 294 | 218 | 159 | 111 | 73 | 43 | 21 | 6 | 0 | 0 | 0 |
| 0.00000 | 500000. | 0 | 0 | 7 | 23 | 44 | 73 | 108 | 151 | 203 | 267 | 346 | 445 | 574 | 750 | 1017 | 1516 |
| | | 2226 | 1491 | 1084 | 813 | 616 | 466 | 349 | 256 | 181 | 121 | 74 | 38 | 13 | 0 | 0 | 0 |
| 0.00000 | 600000. | 0 | 0 | 14 | 38 | 72 | 116 | 170 | 237 | 318 | 417 | 539 | 692 | 890 | 1161 | 1564 | 2288 |
| | | 3011 | 2032 | 1472 | 1094 | 820 | 611 | 449 | 320 | 219 | 139 | 79 | 35 | 8 | 0 | 0 | 0 |
| | | 0 | 6 | 29 | 66 | 117 | 182 | 262 | 359 | 476 | 618 | 792 | 1009 | 1287 | 1662 | 2211 | 3166 |
| .001000 | 200000. | 1119 | 940 | 837 | 761 | 698 | 642 | 592 | 546 | 503 | 463 | 424 | 388 | 354 | 323 | 291 | 260 |
| .001000 | 300000. | 229 | 198 | 167 | 140 | 114 | 90 | 68 | 48 | 30 | 15 | 4 | 0 | 0 | 14 | 53 | 167 |
| | | 1487 | 1147 | 959 | 827 | 724 | 639 | 565 | 500 | 442 | 390 | 342 | 293 | 259 | 227 | 195 | 164 |
| .001000 | 400000. | 133 | 102 | 74 | 51 | 32 | 17 | 6 | 0 | 0 | 3 | 16 | 41 | 83 | 153 | 276 | 548 |
| | | 2052 | 1513 | 1212 | 1004 | 846 | 718 | 612 | 521 | 442 | 372 | 311 | 253 | 211 | 174 | 143 | 111 |
| .001000 | 500000. | 80 | 43 | 26 | 10 | 1 | 0 | 2 | 13 | 34 | 67 | 114 | 182 | 279 | 425 | 660 | 1123 |
| | | 2778 | 2013 | 1574 | 1271 | 1043 | 862 | 714 | 589 | 483 | 393 | 314 | 247 | 191 | 146 | 115 | 83 |
| .001000 | 600000. | 52 | 21 | 5 | 0 | 1 | 13 | 36 | 71 | 121 | 188 | 279 | 401 | 568 | 807 | 1179 | 1872 |
| | | 1518 | 2503 | 1916 | 1507 | 1201 | 960 | 765 | 605 | 471 | 358 | 264 | 185 | 121 | 70 | 31 | 7 |
| | | 0 | 0 | 0 | 0 | 9 | 37 | 83 | 147 | 232 | 342 | 484 | 670 | 916 | 1260 | 1778 | 2703 |
| .002000 | 200000. | 2010 | 1799 | 1665 | 1557 | 1463 | 1376 | 1295 | 1218 | 1143 | 1072 | 1002 | 934 | 869 | 807 | 744 | 682 |
| .002000 | 300000. | 619 | 557 | 495 | 436 | 379 | 324 | 271 | 219 | 170 | 124 | 82 | 44 | 15 | 0 | 6 | 89 |
| | | 2287 | 1916 | 1697 | 1534 | 1399 | 1283 | 1178 | 1082 | 993 | 909 | 830 | 755 | 685 | 621 | 558 | 496 |
| .002000 | 400000. | 433 | 371 | 312 | 258 | 208 | 161 | 119 | 81 | 48 | 22 | 5 | 0 | 9 | 47 | 139 | 380 |
| | | 2765 | 2196 | 1863 | 1624 | 1434 | 1275 | 1138 | 1015 | 905 | 805 | 712 | 623 | 550 | 481 | 419 | 356 |
| .002000 | 500000. | 294 | 231 | 177 | 130 | 89 | 55 | 27 | 8 | 0 | 0 | 15 | 52 | 118 | 232 | 436 | 873 |
| | | 3429 | 2632 | 2162 | 1828 | 1569 | 1356 | 1176 | 1020 | 883 | 761 | 651 | 553 | 466 | 389 | 327 | 264 |
| .002000 | 600000. | 202 | 139 | 91 | 53 | 25 | 6 | 0 | 3 | 21 | 57 | 117 | 207 | 343 | 551 | 891 | 1553 |
| | | 4122 | 3080 | 2456 | 2015 | 1677 | 1405 | 1178 | 985 | 819 | 674 | 548 | 437 | 340 | 256 | 184 | 122 |
| | | 72 | 33 | 8 | 0 | 0 | 0 | 4 | 33 | 84 | 162 | 272 | 425 | 642 | 955 | 1442 | 2337 |
| .003000 | 200000. | 2940 | 2697 | 2532 | 2393 | 2268 | 2150 | 2037 | 1929 | 1823 | 1720 | 1619 | 1520 | 1424 | 1330 | 1237 | 1143 |
| .003000 | 300000. | 1049 | 955 | 862 | 772 | 684 | 598 | 513 | 430 | 350 | 272 | 199 | 130 | 70 | 22 | 0 | 50 |
| | | 3152 | 2750 | 2500 | 2305 | 2139 | 1991 | 1855 | 1728 | 1607 | 1492 | 1382 | 1276 | 1175 | 1080 | 986 | 892 |
| .003000 | 400000. | 798 | 704 | 614 | 529 | 448 | 370 | 296 | 227 | 163 | 105 | 56 | 19 | 0 | 6 | 67 | 276 |
| | | 3561 | 2960 | 2596 | 2326 | 2105 | 1915 | 1746 | 1592 | 1451 | 1319 | 1195 | 1070 | 971 | 871 | 777 | 683 |
| .003000 | 500000. | 589 | 496 | 410 | 331 | 259 | 194 | 135 | 84 | 43 | 14 | 0 | 4 | 38 | 121 | 294 | 700 |
| | | 4156 | 3328 | 2827 | 2462 | 2171 | 1928 | 1717 | 1530 | 1361 | 1208 | 1067 | 937 | 819 | 711 | 617 | 524 |
| .003000 | 600000. | 430 | 336 | 257 | 187 | 128 | 78 | 38 | 11 | 0 | 4 | 32 | 91 | 196 | 373 | 682 | 1312 |
| | | 4800 | 3726 | 3070 | 2598 | 2228 | 1924 | 1666 | 1441 | 1243 | 1067 | 909 | 766 | 638 | 522 | 418 | 324 |
| | | 240 | 167 | 105 | 56 | 19 | 0 | 0 | 0 | 15 | 59 | 137 | 259 | 444 | 725 | 1182 | 2047 |

The "contact stiffness" is then determined. It is assumed the force-displacement response for the roller and race is equal to that of a half space. It is also assumed the contact pressure across a given slice follows an ellipsoidal distribution. The contact stiffness can be shown mathematically. The contact pressure over a given area equals the contact stiffness times the "approach" minus the drop. The "approach" is the displacement of the roller center toward the raceway center.

In the "calculate the approach between the roller and the race" steps, an approach is assumed, and multiplied by the contact stiffness to get the pressure distribution. From the pressure distribution the total reacted load is calculated. The assumed approach is then altered until the reacted load equals the applied load within an acceptable error limit.

To "alter the profile to obtain a uniform stress," the pressure distribution, or contact pressure in the center of each slice is calculated, the diameter of the slice with the highest contact pressure reduced and the pressure distribution recalculated. These steps are repeated until the pressure is uniform along the length of the roller within a given error limit.

In the "profile and approach correct" step, the final profile obtained to get a uniform stress in the previous step and the approach are altered until the uniform contact pressure results in a reacted load that equals the applied load within given error limits.

Using the final pressure distribution calculated above, the contact width determined in "Preliminary calculations" is checked. From the pressure distribution, the loading on each slice is determined. The contact width at each slice is recalculated. If the contact width originally determined differs from the recalculated contact width, a new contact stiffness and new roller profile are continuously calculated until the contact widths do not change significantly from iteration to iteration.

The final step is to "print out" tables like Table I and Table II.

We claim:

1. In a roller bearing having an outer race and an inner race: a plurality of rollers, each roller having a longitudinal external surface having dimensions obtained by a computer which divides the roller along the roller-race contact length into a predetermined number of slices, locates a longitudinal point in each roller slice, and determines the required diameter of the roller at each such longitudinal point to cause a uniform contact stress to be placed on each roller along the length of the roller within an acceptable error limit.

2. A roller bearing in accordance with claim 1 wherein: each roller slice has the same length, and the longitudinal point in each roller slice is the longitudinal center of each roller slice.

3. A roller bearing in accordance with claim 2 wherein: each roller is symmetrical about its longitudinal center.

4. A roller bearing in accordance with claim 2 wherein: each roller is asymmetric about its longitudinal center.

5. A roller bearing in accordance with claim 2 wherein: the acceptable error limit is 10%.

* * * * *